(12) United States Patent
Bouarroudj et al.

(10) Patent No.: US 9,641,031 B2
(45) Date of Patent: May 2, 2017

(54) ROTOR FOR A ROTARY ELECTRIC MACHINE AND ROTARY ELECTRIC MACHINE COMPRISING SUCH A ROTOR

(71) Applicant: VALEO EQUIPEMENTS ELECTRIQUES MOTEUR, Creteil (FR)

(72) Inventors: Lilya Bouarroudj, Charenton le Pont (FR); Jean-Claude Matt, Dijon (FR); Jean-Claude Labrosse, Charenton le Pont (FR)

(73) Assignee: Valeo Equipements Electriques Moteur (FR)

(*) Notice: Subject to any disclaimer, the term of this patent is extended or adjusted under 35 U.S.C. 154(b) by 173 days.

(21) Appl. No.: 14/362,367

(22) PCT Filed: Nov. 6, 2012

(86) PCT No.: PCT/FR2012/052564
§ 371 (c)(1),
(2) Date: Jun. 2, 2014

(87) PCT Pub. No.: WO2013/079842
PCT Pub. Date: Jun. 6, 2013

(65) Prior Publication Data
US 2014/0354104 A1 Dec. 4, 2014

(30) Foreign Application Priority Data
Dec. 1, 2011 (FR) ...................................... 11 61019

(51) Int. Cl.
*H02K 1/27* (2006.01)
*H02K 21/12* (2006.01)

(52) U.S. Cl.
CPC .......... *H02K 1/2706* (2013.01); *H02K 1/2773* (2013.01); *H02K 21/12* (2013.01); *H02K 2213/03* (2013.01)

(58) Field of Classification Search
CPC ............... H02K 1/2773; H02K 1/2706; H02K 2213/03; H02K 1/27; H02K 1/28;
(Continued)

(56) References Cited

U.S. PATENT DOCUMENTS 5,378,953 A 1/1995 Uchida et al.
6,175,177 B1 1/2001 Sabinski et al.
(Continued)

FOREIGN PATENT DOCUMENTS

DE 10 2009 026524 12/2010
EP 0096515 12/1983
(Continued)

*Primary Examiner* — Joshua Benitez Rosario
*Assistant Examiner* — Leda Pham
(74) *Attorney, Agent, or Firm* — Berenato & White, LLC (57) ABSTRACT

A rotor (1) comprising a plurality of alternating magnetic poles formed by permanent magnets (3) distributed regularly between a circumferential portion (5) and a central portion (6) of the magnetic body (2) of the rotor and defining circumferential pole sections (7). The circumferential portion comprises axial grooves (15) which are arranged between the pole sections facing the magnets and which form openings in recesses (4) containing the magnets. The openings have a pre-determined first width (a) such as to minimize a leakage magnetic flux (PhiL) flowing through the circumferential portion (5) and to maximize a useful magnetic flux (PhiU) flowing radially through each of the pole sections (7).

19 Claims, 6 Drawing Sheets

(58) Field of Classification Search
CPC .... H02K 1/2766; H02K 21/024; H02K 21/14; H02K 21/12
IPC .......... H02K 1/2773, 1/2706, 2213/03
See application file for complete search history.

(56) References Cited

U.S. PATENT DOCUMENTS

| | | | |
|---|---|---|---|
| 6,750,584 B2 | 6/2004 | Smith | |
| 7,994,668 B2 | 8/2011 | Gerstler et al. | |
| 8,564,166 B2* | 10/2013 | Pan | H02K 21/16 310/156.48 |
| 9,024,498 B2* | 5/2015 | Murakami | H02K 1/2773 310/156.43 |
| 2003/0107290 A1* | 6/2003 | De Filippis | H02K 1/146 310/216.008 |
| 2009/0096308 A1* | 4/2009 | Staudenmann | H02K 1/2773 310/156.08 |
| 2010/0277017 A1 | 11/2010 | Alexander et al. | |
| 2011/0121668 A1* | 5/2011 | Condamin | H02K 1/2773 310/51 |
| 2011/0316378 A1 | 12/2011 | Matt et al. | |
| 2013/0057103 A1* | 3/2013 | Han | H02K 1/2773 310/156.12 |

FOREIGN PATENT DOCUMENTS

| | | |
|---|---|---|
| EP | 0391791 | 10/1990 |
| EP | 1100176 | 5/2001 |
| EP | 2246962 | 11/2010 |
| FR | 2084279 | 12/1971 |
| JP | H08851 U | 5/1996 |

* cited by examiner

ROTOR FOR A ROTARY ELECTRIC MACHINE AND ROTARY ELECTRIC MACHINE COMPRISING SUCH A ROTOR

CROSS-REFERENCE TO RELATED APPLICATIONS AND CLAIMS TO PRIORITY

This application is a national stage application of International Application No. PCT/FR2012/052564 filed Nov. 6, 2012, which claims priority to French Patent Application No. 1161019 filed Dec. 1, 2011, of which the disclosures are incorporated herein by reference and to which priority is claimed.

TECHNICAL FIELD OF THE INVENTION

The present invention relates to a rotor with permanent magnets which is designed for a rotary electrical machine.

The invention also relates to a rotary electrical machine comprising a rotor of this type, in particular for applications in the field of motor vehicles.

TECHNOLOGICAL BACKGROUND OF THE INVENTION

As a result of their increased performance in terms of output, specific power and power density, nowadays synchronous machines with permanent magnets have extensive application in the field of motor vehicles.

These electrical machines can be produced with a wide range of powers and speeds, and have applications both in vehicles of the "all-electric" type, and in vehicles based on $CO_2$ of the so-called "mild-hybrid" and full-hybrid" types.

The "mild-hybrid" applications generally concern electrical machines of approximately 8 to 10 kW, for example an electric motor which is fitted to the front of the thermal engine, and is coupled to the latter by a drive belt. By means of an electric motor of this type, it is possible to reduce the capacity of the thermal engine ("engine downsizing") by providing electric torque assistance which supplies additional power, in particular during revving up. In addition, traction at low speed, for example in an urban environment, can also be ensured by this same electric motor.

Another example of an application of electrical machines in this power range consists of driving a centrifugal compressor of a double boosting system of a thermal engine. At low speed the electric compressor assists the turbo compressor which is driven by the exhaust gases, and makes it possible to dispense with an additional step in reduction of the capacities.

Applications of the "full-hybrid" type generally concern 30 to 50 kW motors for architectures of the series and/or parallel type, with a better level of integration of the electric motor(s) in the traction chain of the vehicle.

The remarkable performance levels of the present machines with permanent magnets are largely due to the development of rare earth magnets such as magnets of the neodymium-iron-boron (NeFeB), samarium-iron (SmFe) or samarium-cobalt (SmCo) type, which can have remanence in excess of a tesla.

However, machines with permanent magnets comprising a rotor with a so-called "flux concentration" structure have long since made it possible to obtain substantial magnetic fluxes using magnets with lower remanence, for example magnets obtained from sintered or bonded ferrites.

Also dating back a long time, the dimensional and magnetic characteristics of this type of structure have been optimised, either by undertaking many tests, or more recently by carrying out computer simulations, such as to improve the electric output of the machines.

An example of dimensional optimisation of the magnets and magnetic poles of a rotor with permanent magnets was disclosed in 1971 in the patent of invention FR 2.084.279.

The dimensional optimisation of the magnetic poles has recently come to the forefront of attention once more as a result of rare earth magnets becoming more expensive, because of an unfavourable geopolitical situation.

Since the use of rare earth magnets in a rotor of an electrical machine designed for motor vehicle applications is no longer economically viable, and probably not long-lasting, the other alternative consists of magnets based on ferrites.

However, since the remanence of a ferrite is lower than that of a rare earth magnet, the replacement of rare earth magnets by ferrites leads to a machine with lower performance levels.

GENERAL DESCRIPTION OF THE INVENTION

The object of the present invention is thus to optimise the form of the poles of a rotor in order to maximise the magnetic flux in the poles, and thus in particular to preserve the torque of the machine.

Its objective is specifically a rotor of a rotary electrical machine comprising a plurality of alternating North poles and South poles formed from a plurality of permanent magnets arranged in first recesses.

These first recesses extend along an axis of the rotor, and are distributed regularly between a circumferential part and a central part of the magnetic body of the rotor, such as to define a plurality of circumferential polar sections.

The permanent magnets of the rotor type in question have a first polygonal radial section and a first axial plane of symmetry.

The circumferential part in turn comprises axial grooves which are arranged between the polar sections, facing the permanent magnets, and form the openings of the first recesses.

The rotor according to the invention is distinguished in that this opening has a first predetermined width, such as to minimise a magnetic leakage flux which circulates in a circumferential direction in the circumferential part, and to maximise a useful magnetic flux which circulates radially in each of the polar sections, this circumferential part has a predetermined opening ratio, such as to minimise the magnetic leakage flux, and to maximise the useful magnetic flux, this opening ratio being equal to a first ratio of the first width of the opening to a second width of the permanent magnets in a circumferential direction, and this opening ratio is substantially contained between 0.35 and 0.8.

The rotor according to the invention is also distinguished in that the first radial section of the permanent magnets comprises a rectangular part close to the circumferential part, adjacent to a part in the form of a wedge close to the central part.

Advantageously, the rotor according to the invention additionally comprises at least a plurality of second recesses which extend axially, and are arranged between the permanent magnets, in an intermediate part of the rotor, between the central part and the circumferential part.

Non-magnetic braces are preferably arranged in these second recesses.

In a variant embodiment of the rotor according to the invention, the polar sections highly advantageously additionally have a second radial section which forms a lobe on the exterior, and a second axial plane of symmetry.

A second ratio of the second width of the magnets to a sum of the first width of the opening and a third width of the lobe, in the circumferential direction, substantially contained between 0.25 and 0.6, preferably characterises the rotor in this variant.

Advantage will be derived from the fact that the permanent magnets of the rotor of the rotary electrical machine according to the invention consist of ferrite.

The invention also relates to a rotary electrical machine which comprises a rotor with the above characteristics.

These few essential specifications will have made apparent to persons skilled in the art the advantages provided by the rotor of the rotary electrical machine according to the invention, as well as by the corresponding electrical machine, in comparison with the prior art.

The detailed specifications of the invention are given in the following description in association with the appended drawings. It should be noted that these drawings serve the purpose simply of illustrating the text of the description, and do not constitute in any way a limitation of the scope of the invention.

DESCRIPTION OF THE PREFERRED EMBODIMENTS OF THE INVENTION

Figure 1:
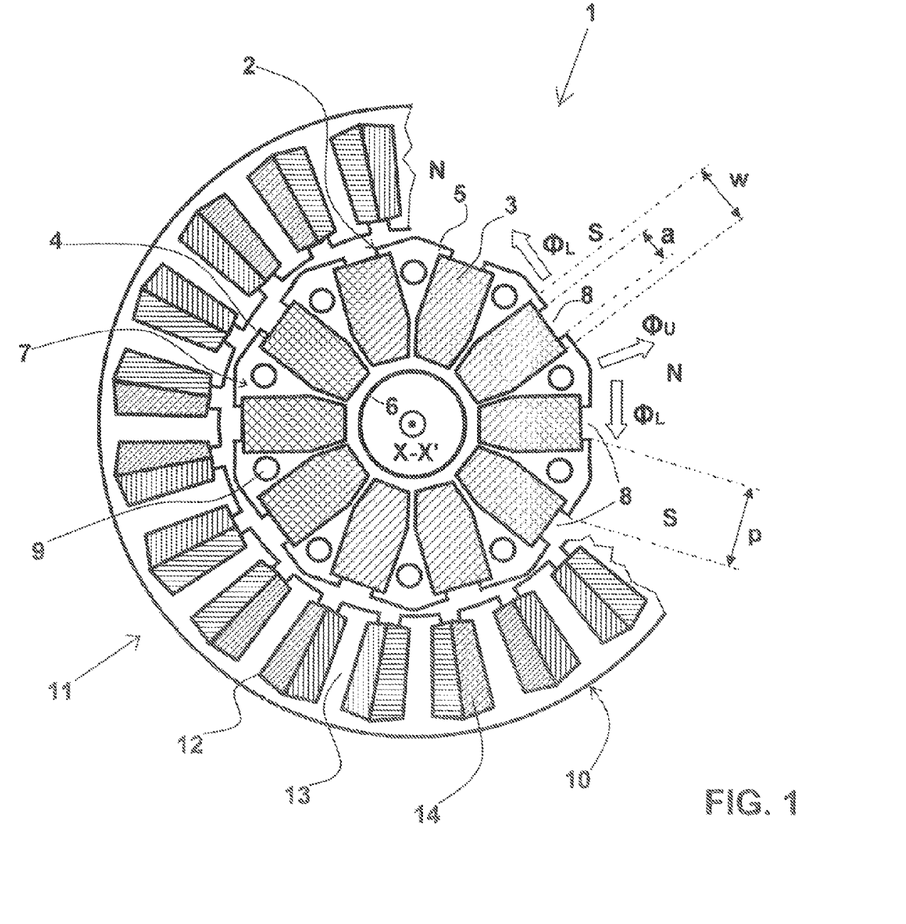
FIG. 1 shows a view in simplified radial cross-section of a rotor with permanent magnets in a main embodiment of the invention, arranged in a stator, shown in partial radial cross-section, of a rotary electrical machine according to the invention.

The simplified radial cross-section of a rotor 1 with permanent magnets in the main embodiment of the invention represented in FIG. 1 shows clearly the arrangement in the magnetic body 2 of the permanent magnets 3 in the first recesses 4 which are distributed regularly between a circumferential part 5 and a central part 6, such as to form a plurality of alternating North poles N and South poles S.

The rotor 1 according to the invention is of the flux concentration type. The permanent magnets 3 have a globally substantially rectangular cross-section, but are chamfered in the form of a wedge towards the axis X-X' of the rotor 1. They extend symmetrically in the vicinity of equi-angular axial planes.

The first recesses 4 in which the permanent magnets 3 are arranged delimit ten circumferential polar sections 7.

The circumferential part 5 comprises axial grooves 8 which are arranged between the polar sections 7, facing the permanent magnets 3, and forming the opening of the first recesses 4.

The polar sections 7 comprise second recesses 9 which are arranged between the permanent magnets 3. They extend symmetrically in the vicinity of equi-angular axial planes.

These second recesses 9 have a circular cross-section, and receive non-magnetic braces which retain the sets of metal plates which form magnetic bodies 2, 10 of the rotor 1 and of a stator 11.

These second recesses 9 also contribute towards controlling the magnetic field in the rotor 1.

According to a particular embodiment of this machine, the rotor 1 comprising ten permanent magnets 3 rotates inside a stator 11 which has a plurality of notches 12 defining a plurality of stator teeth 13, around which stator windings 14 are arranged.

A specific embodiment of a machine comprising a rotor 1 of this type is for example an 8 to 10 kW motor/generator for applications in motor vehicles of the so-called "mild-hybrid" type.

In its mode in which it is functioning as a motor, this machine can be designed for starting of the thermal engine, torque assistance for the thermal engine, electric traction at low speed of the vehicle, as well as for driving of a centrifugal compressor.

A stator current passes through the stator windings 14, which create a rotary magnetic field which rotates the rotor 1. The engine torque supplied depends in particular on the intensity of the stator current and on the magnetic flux in the rotor 1.

As explained in the preamble, the replacement of the rare earth permanent magnets 3 by ferrite permanent magnets 3 requires optimisation of the magnetic poles N, S, in order to obtain a similar magnetic flux in the rotor 1, and thus maintain the same engine torque for the same stator intensity.

Computer simulations of electrical machines comprising a rotor 1 with the above characteristics have allowed the inventive body to establish the distribution of the magnetic flux in the rotor 1 and in the stator 11.

It has been established that the magnetic flux which is created by the permanent magnets 3, and circulates in the magnetic body 2 of the rotor 1, is distributed between a useful magnetic flux $\Phi U$ which circulates radially in a polar section 7, and a magnetic leakage flux $\Phi L$ which circulates in a circumferential direction in the circumferential part 5 of the rotor 1.

The magnetic leakage flux $\Phi L$ depends on the first width a of the opening 8 of the recesses 4 which contain the permanent magnets 3. The larger this first width a, the more the magnetic leakage flux $\Phi L$ decreases, since a first reluctance in this location of the circumferential part 5 increases, but the useful magnetic flux ΦU also decreases, since a surface of a pole N, S facing, with a stator tooth 13, decreases.

There is therefore a first optimum width a of the opening 8, which is determined by the simulation, for which the magnetic leakage flux ΦL is minimum and the useful magnetic flux ΦU is maximum.

Figure 2:
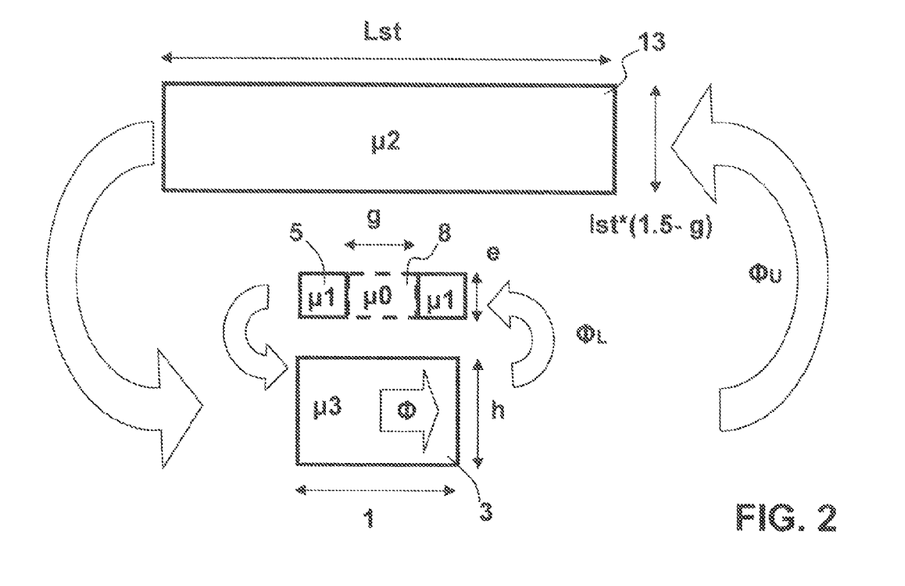
FIG. 2 shows a simplified model of the influence of the grooves which form an opening of the circumferential part of the rotor, on the circulation of the magnetic fluxes in the rotor according to the invention.

A simplified model of the influence of the first width a on the distribution of the useful magnetic flux ΦU and magnetic leakage flux ΦL in the rotor 1 is shown in FIG. 2.

The variations of the first width a of the opening 8 are added to the variations of an opening ratio g equal to a ratio of the first width a to a second width w of the permanent magnets 3. Thus, this ratio g varies from 0, when the first recesses 4 are completely open to the exterior, to 1, when these first recesses 4 are completely closed.

The first reluctance is derived from the sum of the reluctances of a first segment 8 of the circumferential part 5 of the rotor 1 with a first length equal to g, which has a first relative permeability $\mu 0$ (equal to that of the air), and a second segment 5 with a second length 1−g, a second relative permeability $\mu 1$ of which is that of the first casing 2 of the rotor 1. The first and second segments 8, 5 have a thickness e with w as a unit.

A second reluctance which intervenes in this simplified model is that of a magnetic circuit in which the useful magnetic flux ΦU circulates between the poles N, S of the rotor 1 and the stator teeth 13 of the stator 11, with a third length Lst, a third relative permeability $\mu 2$ of which is that of a second casing 10 of the stator 11.

In this simplified model, it is considered that the surface of a pole N, S facing, with a stator tooth 13, varies linearly according to g, in accordance with a law lst*(1.5−g), such that a dimension of this circuit in the circumferential direction varies according to the same law.

The permanent magnets 3 are considered as a flux generator Φ=ΦU+ΦL with a third reluctance in parallel derived from a medium with a size equal to 1 in the circumferential direction, a height equal to h with w as a unit, and a fourth relative permeability $\mu 3$.

Figure 3:
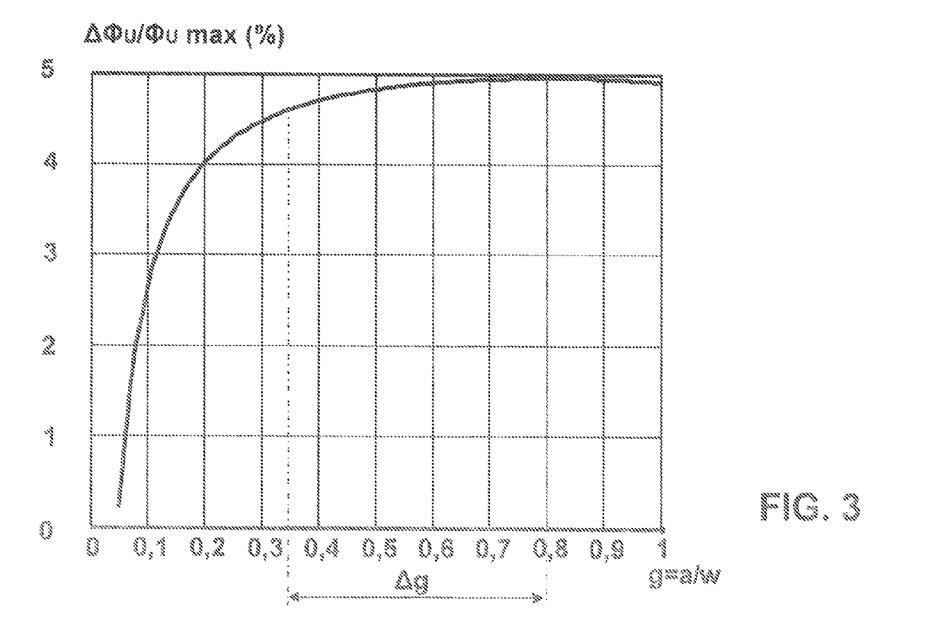
FIG. 3 shows the relative variation of the useful flux in the vicinity of a maximum useful flux, according to the opening ratio obtained by the simplified model shown in FIG. 2.

FIG. 3 shows the relative variation of the useful magnetic flux ΦU in the vicinity of the maximum ΦU max, according to g.

It is found that the useful magnetic flux ΦU increases when the opening ratio g goes up to 0.80.

In this simplified model, a range Δg of the values of g contained between substantially 0.35 and 0.80 makes it possible to render the useful magnetic flux ΦU maximum, with the useful flux ΦU varying only by 0.5% in this range Δg.

Figure 4:
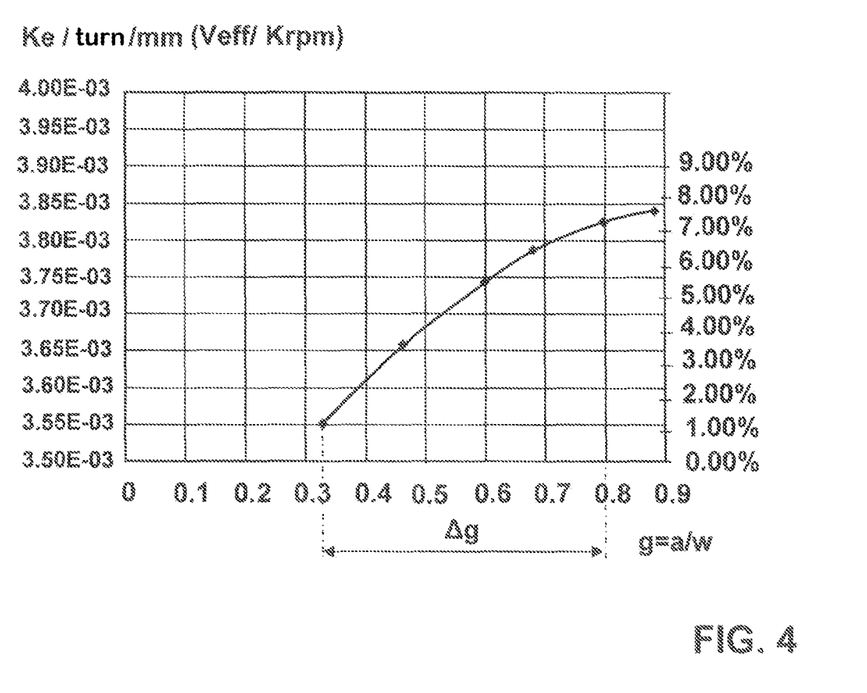
FIG. 4 shows the absolute and relative variations, in the vicinity of a maximum, of the electromotive force constant between phases, according to the opening ratio obtained by computer simulation of a complete machine comprising a rotor according to the embodiment shown in FIG. 1.

A more realistic computer simulation of a rotary electrical machine comprising a rotor 1 according to the invention confirms the existence of a maximum of the useful flux ΦU for a value of the opening ratio g substantially equal to 0.8, as shown in FIG. 4.

This figure shows the development of the electromotive force constant between phases Ke for values of the opening ratio g contained substantially between 0.3 and 0.9.

The constant Ke is representative of the useful magnetic flux ΦU. It is found that it increases in order to reach a maximum towards a ratio of opening g of approximately 0.8.

The optimised structure of the rotor 1 assists in the preservation of the performance levels of the machine when ferrites are used instead of rare earth magnets, without increasing excessively the body of the permanent magnets 3.

With constant technology, the invention which contributes towards the increase in the magnetic flux in the rotor 1 also makes it possible to reduce the intensity of the rotary magnetic field created by the stator 11, which is necessary in order to produce a given torque, and consequently makes it possible to reduce the body of copper necessary in order to produce the stator windings 14.

The reduction of the body of the permanent magnets 3 and of the copper makes it possible to reduce the manufacturing costs, and therefore provides a commercial advantage in the highly competitive field of vehicle equipment.

However, the possibilities of optimisation of the useful magnetic flux ΦU in the above-described main embodiment of the invention, using the first width a of the opening of the first recesses 4, are limited by the fact that the circumferential polar sections 7 have a third width p which tends to decrease when a increases, thus giving rise to a rapid increase in the second reluctance of the magnetic circuit between the poles N, S of the rotor 1 and the stator teeth 13 of the stator 11.

Figure 5:
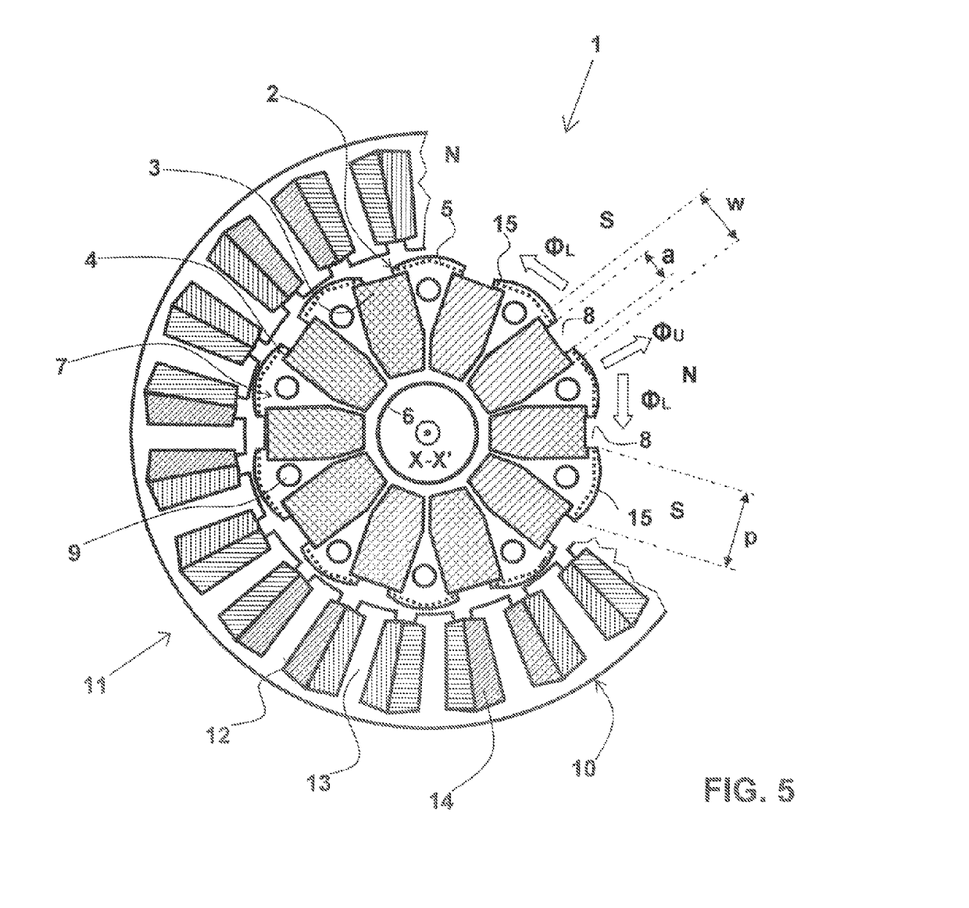
FIG. 5 shows a view in simplified radial cross-section of a rotor with permanent magnets according to a variant embodiment of the invention, arranged in a stator, shown in partial radial cross-section, of a rotary electrical machine according to the invention.

In a variant embodiment, which is designed to reduce the negative effects of the increase in the first width a, shown in FIG. 5, the polar sections 7 have a second radial section which forms a lobe 15.

The assembly of these polar sections 7 then forms in radial cross-section a substantially circular figure with a plurality of lobes 15, corresponding to the prominence of the poles N, S.

Thus, the partial covering of the permanent magnets 3 by the lobes 15 at the periphery of the rotor 1 increases the thickness of the circumferential part 5 (the broken line in FIG. 5 shows the outer surface of the rotor in the main embodiment), and contributes towards attenuating the increase in the second reluctance of the magnetic circuit rotor 1-stator 11, when the opening ratio g increases, in other words it assists in maximising the useful magnetic flux ΦU whilst minimising the magnetic leakage flux ΦL.

In this variant embodiment, the inventive body has determined that a second ratio of the second width w of the permanent magnets 3, to a sum of the first width a of the opening 8 and the third width p of the lobe, which is substantially contained between 0.25 and 0.6, is optimum.

Figure 6A:
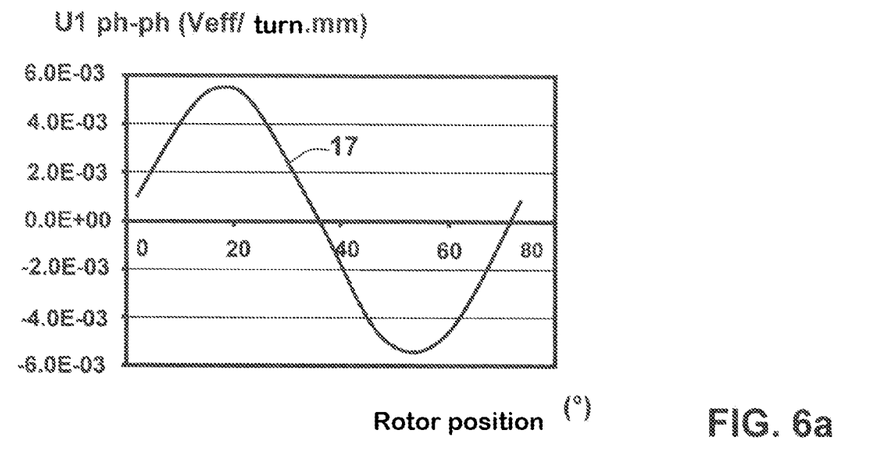
FIGS. 6a and 6b show respectively the wave form of the electromotive force between phases off-load, and the corresponding harmonic levels of a rotary electrical machine comprising a rotor according to the variant embodiment of the invention shown in FIG. 5.
Figure 6B:
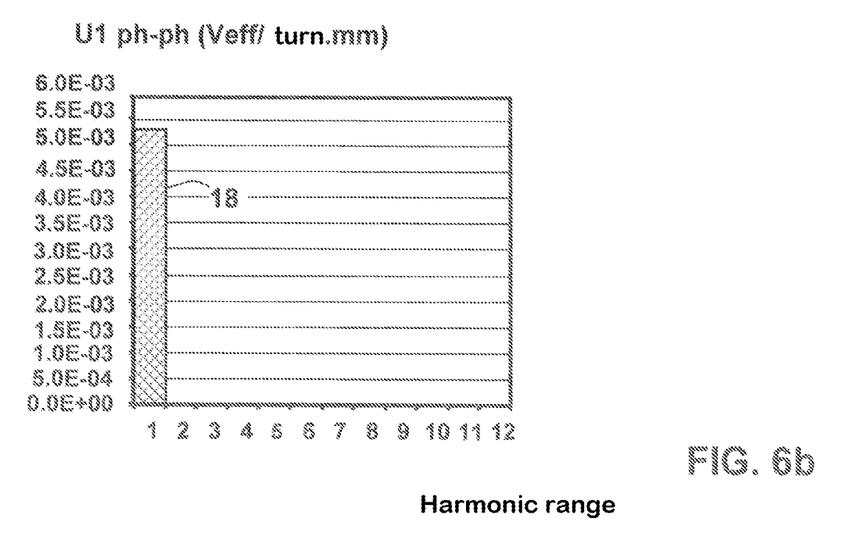

The advantage of this variant is magnetic noise generated by the machine which is reduced by means of the decrease of the harmonic distortions of the electromotive force and the torque, as shown in FIGS. 6a and 6b.

In fact, a wave form 17 of the electromotive force between phases U1 ph-ph, off-load, of a machine comprising a rotor 1 according to this variant (FIG. 5) appears to be substantially sinusoidal in FIG. 6a.

FIG. 6b confirms that there are no harmonics other than the basic harmonic 18.

Figure 7A:
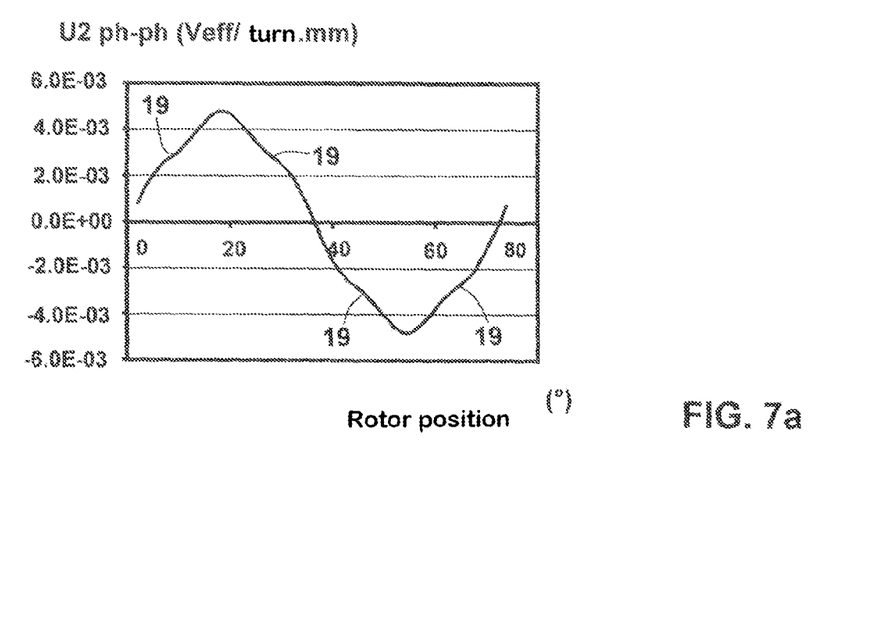
FIGS. 7a and 7b show respectively the wave form of the electromotive force between phases off-load, and the corresponding harmonic levels of a rotary electrical machine of the type shown in FIG. 5, but the circumferential part of the rotor of which does not comprise grooves which form an opening.
Figure 7B:
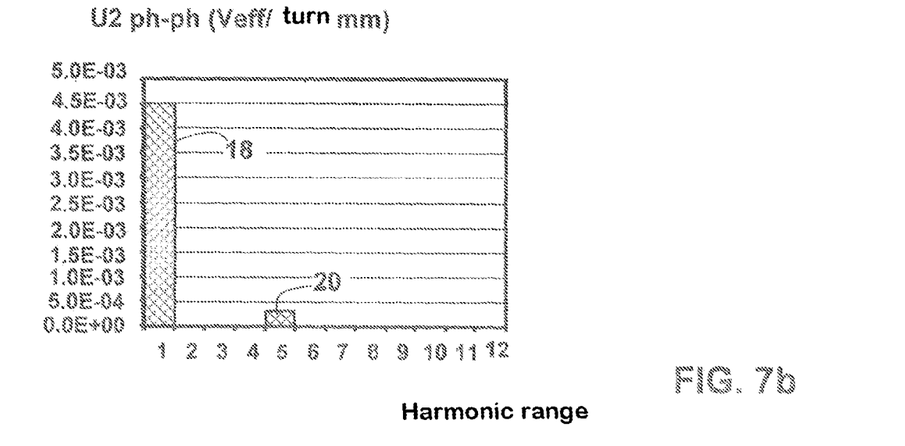

In comparison, FIGS. 7a and 7b show the same characteristics corresponding to a rotary electrical machine (not represented) of the type shown in FIG. 5, but the circumferential part 5 of the rotor 1 of which does not comprise grooves 8 which form an opening.

In FIG. 7a, it can be seen clearly that the other electromotive force between phases U2 ph-ph has distortions 19 in comparison with a sinusoidal wave form 17.

FIG. 7b confirms that a harmonic of the fifth rank 20 with an amplitude representing more than 6% of the basic harmonic 18 is present in this case, whereas it did not exist for the machine comprising a rotor 1 according to the variant embodiment (FIG. 5).

It will be appreciated that the invention is not limited simply to the above described preferred embodiments.

Other embodiments based on numerical values different from those specified above, in particular a different number of poles Np, and corresponding to other tests or simulations of rotary electrical machines comprising a rotor of the type described, would not depart from the context of the present invention, provided that they are derived from the following claims.

The invention claimed is:

1. A rotor (1) of a rotary electrical machine comprising a plurality of alternating North (N) poles and South (S) poles formed from a plurality of permanent magnets (3) arranged in first recesses (4) which extend along an axis (X-X') of said rotor (1), and are distributed regularly between a circumferential part (5) and a central part (6) of a magnetic body (2) of said rotor (1), to define a plurality of circumferential polar sections (7), said permanent magnets (3) having a first polygonal radial section and a first axial plane of symmetry, said permanent magnets (3) also having a substantially rectangular cross-section and are chamfered in the form of a wedge toward the axis of said rotor and said circumferential part (5) comprising axial grooves (8) which are arranged between said polar sections (7), facing said permanent magnets (3), and forming the openings of said first recesses (4), wherein said opening (8) has a first predetermined width (a), to minimize a magnetic leakage flux ($\Phi L$,) which circulates in a circumferential direction in said circumferential part (5), and to maximize a useful magnetic flux ($\Phi U$) which circulates radially in each of said polar sections (7), said circumferential part (5) has a predetermined opening ratio (g), to minimize said magnetic leakage flux ($\Phi L$), and to maximize said useful magnetic flux ($\Phi U$), said opening ratio being equal to a first ratio of said first width (a) to a second width (w) of said permanent magnets (3) in a circumferential direction, and said opening ratio (g) is substantially contained between 0.35 and 0.8.

2. Rotor (1) of a rotary electrical machine according to claim 1, characterized in that said permanent magnets first polygonal radial section comprises a rectangular part oriented towards said circumferential part (5), adjacent to a second part in the form of a wedge oriented towards said central part (6).

3. Rotor (1) of a rotary electrical machine according to claim 2, characterized in that it comprises at least a plurality of second recesses (9) which extend axially, and are arranged between said permanent magnets (3), in an intermediate part of said rotor (1), between said central part (6) and said circumferential part (5).

4. Rotor (1) of a rotary electrical machine according to claim 2, characterized in that said permanent magnets (3) consist of ferrite.

5. Rotor (1) of a rotary electrical machine according to claim 2, characterized in that said polar sections (7) have a second radial section which forms a lobe (15) on the exterior, and a second axial plane of symmetry.

6. Rotary electrical machine, characterized in that it comprises a rotor (1) according to claim 2.

7. Rotor (1) of a rotary electrical machine according to claim 1, characterized in that it comprises at least a plurality of second recesses (9) which extend axially, and are arranged between said permanent magnets (3), in an intermediate part of said rotor (1), between said central part (6) and said circumferential part (5).

8. Rotor (1) of a rotary electrical machine according to claim 7, characterized in that non-magnetic braces are arranged in said second recesses (9).

9. Rotor (1) of a rotary electrical machine according to claim 8, characterized in that said permanent magnets (3) consist of ferrite.

10. Rotor (1) of a rotary electrical machine according to claim 8, characterized in that said polar sections (7) have a second radial section which forms a lobe (15) on the exterior, and a second axial plane of symmetry.

11. Rotor (1) of a rotary electrical machine according to claim 7, characterized in that said permanent magnets (3) consist of ferrite.

12. Rotor (1) of a rotary electrical machine according to claim 7, characterized in that said polar sections (7) have a second radial section which forms a lobe (15) on the exterior, and a second axial plane of symmetry.

13. Rotor (1) of a rotary electrical machine according to claim 1, characterized in that said permanent magnets (3) consist of ferrite.

14. Rotor (1) of a rotary electrical machine according to claim 13, characterized in that said polar sections (7) have a second radial section which forms a lobe (15) on the exterior, and a second axial plane of symmetry.

15. Rotor (1) of a rotary electrical machine according claim 1, characterized in that said polar sections (7) have a second radial section which forms a lobe (15) on the exterior, and a second axial plane of symmetry.

16. Rotor (1) of a rotary electrical machine according to claim 15, characterized in that a second ratio of said second width (w) to a sum of said first width (a) and a third width (p) of said lobe (15), in said circumferential direction, is substantially contained between 0.25 and 0.6.

17. Rotary electrical machine, characterized in that it comprises a rotor (1) according to claim 1.

18. A rotor (1) of a rotary electrical machine comprising a plurality of alternating North (N) poles and South (S) poles formed from a plurality of permanent magnets (3) arranged in first recesses (4) which extend along an axis (X-X') of said rotor (1), and are distributed regularly between a circumferential part (5) and a central part (6) of a magnetic body (2) of said rotor (1), to define a plurality of circumferential polar sections (7), said permanent magnets (3) having a first polygonal radial section and a first axial plane of symmetry, said polar sections (7) having a second radial section which forms a lobe (15) on the exterior, and a second axial plane of symmetry, and said circumferential part (5) comprising axial grooves (8) which are arranged between said polar sections (7), facing said permanent magnets (3), and forming the openings of said first recesses (4), wherein said opening (8) has a first predetermined width (a), to minimize a magnetic leakage flux ($\Phi L$) which circulates in a circumferential direction in said circumferential part (5), and to maximize a useful magnetic flux ($\Phi U$) which circulates radially in each of said polar sections (7), said circumferential part (5) has a predetermined opening ratio (g), to minimize said magnetic leakage flux ($\Phi L$), and to maximize said useful magnetic flux ($\Phi U$), said opening ratio being equal to a first ratio of said first width (a) to a second width (w) of said permanent magnets (3) in a circumferential direction, and said opening ratio (g) is substantially contained between 0.35 and 0.8.

19. A rotor (1) of a rotary electrical machine comprising a plurality of alternating North (N) poles and South (S) poles formed from a plurality of permanent magnets (3) arranged in first recesses (4) which extend along an axis (X-X') of said rotor (1), and are distributed regularly between a circumferential part (5) and a central part (6) of a magnetic body (2) of said rotor (1), to define a plurality of circumferential polar sections (7), and further comprising at least a plurality of second recesses (9) which extend axially, and are arranged between said permanent magnets (3), in an intermediate part of said rotor (1), between said central part (6) and said circumferential part (5), said permanent magnets (3) having a first polygonal radial section and a first axial plane of symmetry, and said circumferential part (5) comprising axial grooves (8) which are arranged between said polar sections (7), facing said permanent magnets (3), and forming the openings of said first recesses (4), wherein said opening (8) has a first predetermined width (a), to minimize a magnetic leakage flux ($\Phi L$) which circulates in a circumferential direction in said circumferential part (5), and to maximize a useful magnetic flux ($\Phi U$) which circulates radially in each of said polar sections (7), said circumferential part (5) has a predetermined opening ratio (g), to minimize said magnetic leakage flux ($\Phi L$), and to maximize said useful magnetic flux ($\Phi U$), said opening ratio being equal to a first ratio of said first width (a) to a second width (w) of said permanent magnets (3) in a circumferential direction, and said opening ratio (g) is substantially contained between 0.35 and 0.8.

\* \* \* \* \*